Dec. 15, 1953 K. C. JENNE 2,662,714
CROSS ARM SUPPORTING GAIN FOR ATTACHMENT
TO TRANSMISSION LINE POLES
Filed June 11, 1949 2 Sheets-Sheet 1
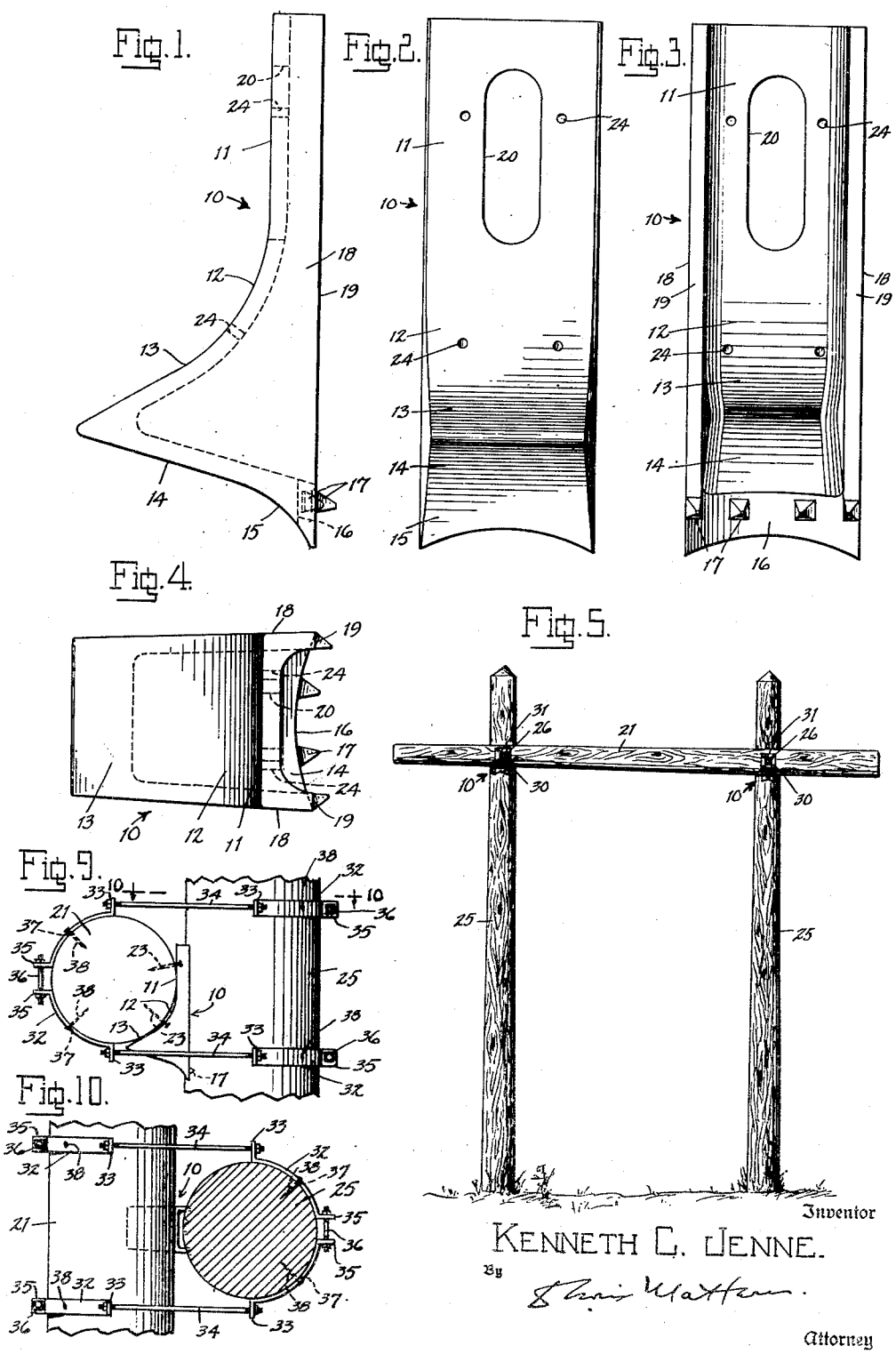
Inventor
KENNETH C. JENNE.
By
Attorney Dec. 15, 1953  K. C. JENNE  2,662,714
CROSS ARM SUPPORTING GAIN FOR ATTACHMENT
TO TRANSMISSION LINE POLES
Filed June 11, 1949  2 Sheets-Sheet 2
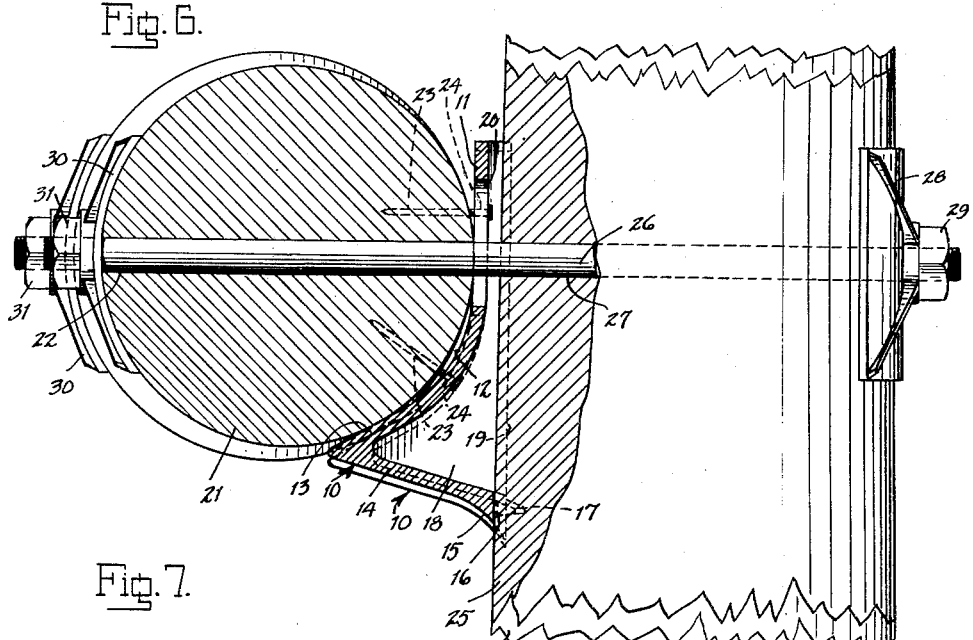
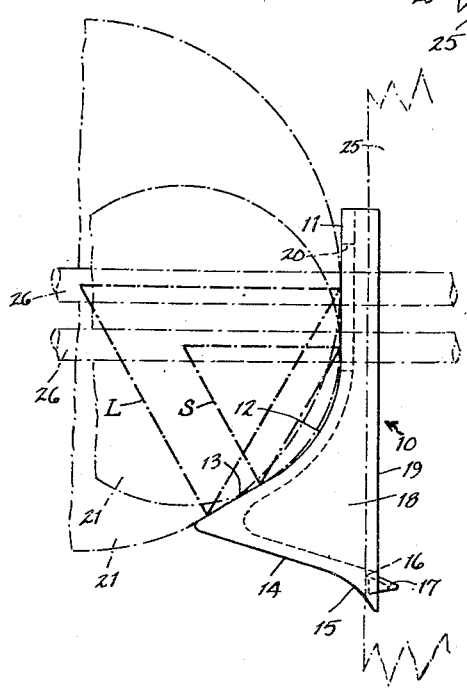
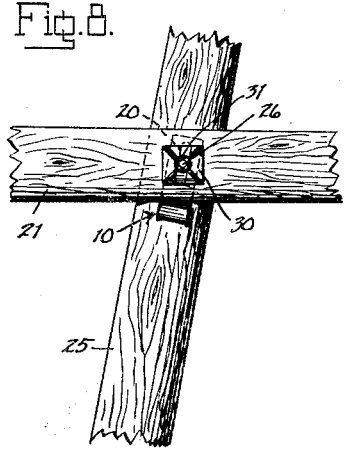
Inventor
KENNETH C. JENNE.
By
Attorney Patented Dec. 15, 1953

2,662,714

UNITED STATES PATENT OFFICE 2,662,714

CROSS ARM SUPPORTING GAIN FOR ATTACHMENT TO TRANSMISSION LINE POLES

Kenneth C. Jenne, Branford, Conn., assignor to Malleable Iron Fittings Company, Branford, Conn., a corporation of Connecticut Application June 11, 1949, Serial No. 98,574

4 Claims. (Cl. 248—221)

The present invention relates to a cross arm supporting gain for attachment to poles such as transmission line poles, and particularly a gain for the support of the cross arm of an H-frame structure consisting of two upright poles supported at spaced points in the ground and a horizontally disposed cross arm connected to the uprights near their upper ends, the cross arm usually projecting outwardly beyond each of the uprights. An object of the invention is to provide a gain of this character, especially adapted to effectually support a cross arm of round or circular cross section and usually tapered between its ends, that is, a cross arm consisting of a length of unsquared timber from which the bark has been removed, but is otherwise in its natural state, as distinguished from a squared cross arm formed from a length of timber having slabs removed from its four sides. The cross arm may be of equal diameter throughout its length, or may be tapered from the center toward each end, these shapes being produced by turning.

The round cross arm has a number of advantages over the squared cross arm, aside from the fact that the expense of trimming and handling in the mill is eliminated. The round cross arm has greater inherent strength, and when fastened by bolts through its diametric center its maximium load supporting potentialities may be fully realized.

The conventional type of cross arm gain heretofore in use has been designed especially for the support of a squared cross arm, being provided with a right-angle step in which one corner of the cross arm is seated, a hole being provided above the step for receiving the through-bolt for attaching the gain and cross arm to the upright. In using this type of gain for the support of a round tapered cross arm it is not possible, because of the variation of the diameter of the cross arm, to uniformly fasten the cross arm by through bolts extending through its diametric center. Furthermore, the step support is only engaged at its outer edge by the cross arm, so that various diameters of cross arms will not be uniformly supported. Also it is impractical to drill the holes in the cross arm to receive the through-bolts before its actual installation, as the position of these holes will vary, depending upon the particular diameter of the spar arm at the point where it is supported on the gain.

It is proposed according to the invention to provide a cross arm supporting gain which may be produced in a single standardized size, and which is adapted to accommodate all diameters of cross arms within the range commonly used, such range being for instance between 6½ and 12½ inches in diameter. It is further proposed to provide a gain in which the through-bolt may be engaged through the diametric center of the cross arm, and in which the point of support of the cross-arm on the gain is always in substantially the same relation to the center of gravity of the cross arm regardless of its diameter.

A further object is to provide a cross arm supporting gain which will permit the upright poles to be rocked or tilted to a considerable degree, without causing the gain to be displaced upon the vertical pole, while at the same time providing adequate support for the cross arm.

With the above and other objects in view, an embodiment of the invention is shown in the accompanying drawings and this embodiment will be hereinafter more fully described with reference thereto, and the invention will be finally pointed out in the claims.

In the drawings:

Fig. 1 is a side elevation of a cross arm supporting gain, according to the illustrated exemplary embodiment of the invention.

Fig. 2 is a front elevation.

Fig. 3 is a rear elevation.

Fig. 4 is a top plan view.

Fig. 5 shows an H-frame structure in which the cross arm is supported upon gains according to the invention.

Fig. 6 is a fragmentary side elevation, partly in vertical section, showing an H-frame structure wherein a tapered cross arm is supported on two upright poles.

Fig. 7 is a side elevation of the gain showing diagrammatically by- dot-and-dash lines the relative positions of cross arms of small and large diameters supported upon the gain.

Fig. 8 shows the relative positions of the cross arm and gain in the case of the upright pole being tilted or rocked over from its normal vertical position.

Fig. 9 is a side elevation, on a reduced scale, showing the gain of the invention employed with external bolt means securing the cross arm to the pole.

Fig. 10 is a sectional view along the line 10—10 of Fig. 9.

Referring to the drawings, the cross arm supporting gain, according to the illustrated exemplary embodiment of the invention, comprises a one-piece body, indicated generally as 10, and preferably in the form of a malleable iron casting, consisting of a forward wall having an upper flat-surfaced vertical wall portion 11, a downwardly and outwardly curved wall portion 12, and a downwardly and outwardly inclined wall portion 13, the vertical and inclined wall portions 11 and 13 being tangential to the curved surface 12. The forward end of the inclined wall portion 13 forms a point with the forward end of the lower downwardly and inwardly inclined wall portion 14, the inner end of which is curved downwardly at its lower side, as at 15, to provide a gradually increasing thickness terminating in a concave heel or bearing surface 16 adapted to substantially conform to the curvature of the upright pole. A series of spur teeth 17 are provided across the heel surface for digging into the pole to resist downward sliding movement of the gain thereon. Side walls 18—18 enclose the sides of the body member and have vertically disposed rearward surfaces 19—19 which constitute vertical ribs for engagement with the surface of the upright pole. A vertically disposed slot 20 for receiving the through-bolt is provided in the upper vertical wall portion 11.

In practice the radius of the curved wall 12 is approximately equal to the radius of the smallest size cross arm to be supported, the tangent wall portion 13 being at an angle of approximately 120° with the upper vertical wall portion 11. It has been found that this angle allows a larger range of cross arm sizes for a given length of the slot 20, and consequently a shorter over-all height to the gain. Also it automatically keeps the point of support approximately the same distance from the center of gravity throughout the full range and gives a flat surface—not an edge—for the cross arm to rest on.

The gain is assembled with the cross arm and upright poles as follows:

While the cross arm 21 is on the ground it is drilled at the desired mounting points with horizontal diametric bolt-receiving holes 22 and thereupon the gains are attached to the pole in relation to each of the drilled holes. In practice each gain is placed against the cross arm so that the vertical wall portion 11 is at a right angle to the axis of the hole 22 with the slot 20 in line with the hole. The inclined supporting surface 13 is then brought into contact with the surface of the cross arm and the gain is fastened to the cross arm by nails 23 engaged through holes 24 provided in the gain. The cross arm together with the gains secured thereto is then mounted upon the upright poles 25—25, each of which is provided with a horizontally disposed through-bolt 26 engaged in a hole 27, by engaging the through-bolts through the slots 20 of the gains and through the holes 22 of the cross arms. A curved washer 28 is engaged upon the through-bolt at the rearward side of each upright pole and is secured by a nut 29 screwed upon the rearward end of the through-bolt. A curved washer 30 is engaged upon the forward end of each through-bolt against the forward side of the cross arm and is secured by a nut 31. Tightening of the nuts 29 and 31 forces the cross arm inwardly against the gain and forces the gain tightly against the forward surface of the upright pole, the combined tightening action and the weight of the cross arm causing the inner edges of the side walls to engage firmly against the pole and causing the spur teeth 17 of the heel surface 16 to bite into the upright pole.

As shown clearly in Fig. 6, a tapered cross arm is supported upon two upright poles in an H-frame structure. The smaller diameter end of the cross arm has its horizontal diametric center line in horizontal line with the horizontal diametric center line of the larger diameter end of the cross arm, the gain supporting the smaller end being mounted higher than the gain supporting the larger end, so that the through-bolt engaged with the larger end is at a higher point in the slot 20 of its supporting gain than the through-bolt of the smaller end. Thus, irrespective of the diameter of the cross arm, it is firmly engaged with the gain at two surface areas, namely along the vertical wall portion 11 and along the downwardly and outwardly inclined wall portion 13. As shown in Fig. 7, a large diameter cross arm will be supported upon the gain so that the through-bolt extending through its horizontal diametric center is near the top of the slot 20 and its point of engagement with the surface of the inclined wall 13 is near the outer end of this surface, while the small diameter cross arm has its through bolt engaged near the bottom of the slot 20 and its point of engagement with the surface of the inclined wall 13 relatively higher up on this surface than the larger diameter cross arm. These points of engagement are substantially proportional for the complete range of sizes, being in substantially the same relation to the center of gravity of the cross arm. The comparative relation is shown by the triangles "L" and "S" connecting the center of gravity and the contact points with the gain of the large and small diameter cross arms.

Assuming the center of gravity is through the vertical diametric center line of the cross arm and at a point outwardly of the point of engagement of the cross arm with the wall portion 13, a vertical load on the cross arm results in a rotating force applied to the gain, causing the heel of the gain to press firmly against the upright pole with increasing force as the load is increased, as distinguished from a sliding or shearing force that would result in the case of supporting the load in vertical line with the center of gravity or at a point outwardly of the center of gravity. Consequently a relatively great load may be imposed upon the cross arm without bending of the through-bolt and without causing the gain to be forced downwardly upon the upright pole. The larger the diameter of the cross arm the greater is the distance from the pole at which the weight of the cross arm is imposed upon the gain so that the resulting force tends only to increase the pressure at the heel of the gain. Assuming that there is sufficient bearing area at the heel of the gain and that the washers 27 and 29 are of adequate size, there will be no appreciable difference in the performance of the gain between the smaller and larger diameter cross arms. The same effective support will also be provided in the case of cross arms which may be of oval or out of round cross-section, or which may have flat, depressed or projected surfaces. In each such case one point will firmly engage the vertical surface 11 and another point will firmly engage the surface 13.

Pole installations are sometimes subject to storm or other conditions which may cause them to tilt or rock over. The gain of the invention is designed to minimize the damage that may result from these conditions. As shown in Fig. 8, the gain will remain in aligned position upon the upright pole when the latter is tilted, while the cross arm remains horizontal, the through bolt being forced upwardly in the slot 20 as the supporting surface 13 assumes an angle to the cross arm. Consequently the danger of breaking the cross arm or the gain is minimized, and adequate bearing of the heel of the gain against the pole is maintained.

In Figs. 9 and 10 the gain is shown in a pole installation where it is desired to eliminate drilled holes through the cross arm and vertical pole. The gain 10 is first fastened to the cross arm 21 by nails 23 before mounting on the vertical pole 25, so that the cross arm is in engagement with the vertical surface 11 at its horizontal diametric point and is in contact with the inclined surface 13 at a point substantially centrally of the vertical surface 10 and the center axis of the cross arm 21, as shown in the diagrammatic illustration in Fig. 7. Pairs of substantially semi-circular clamps 32 are respectively engaged about the cross arm 21 at each side of the gain and about the vertical pole 25 above and below the gain, these clamps being provided with end flanges 33 connected by bolts 34. The clamps are each preferably formed of two quarter-round parts provided at their inner ends with flanges 35 connected by bolts 36, so that the clamps may be adjusted to different diameter poles. The clamps are also provided with nail receiving holes 37, so that they may be fixed upon the cross arm and vertical pole by nails 38 to prevent relative turning movement. As the gain is employed in this type of installation without the through bolt 26, the slot opening 20 may be eliminated, but for standardization purposes it is preferably included so that the same gain may be used in either type of installation.

I have illustrated and described a preferred and satisfactory embodiment of the invention, but it will be understood that changes may be made therein within the spirit and scope thereof as defined in the appended claims.

What is claimed is:

1. A gain, for use between the upright face of a vertical pole and the inner and lower sides of a horizontal cross arm of substantially circular cross-section to oppose the downward and inward force imposed by the cross arm, comprising a body member having a pole engaging rearward side having generally vertical pole engaging bearing surfaces, and a forward side including an upper generally vertical wall portion substantially parallel to said pole engaging bearing surfaces and of substantial length to constitute a vertically ranging cross arm engaging surface, a generally inclined wall portion extending downwardly and forwardly from said upper wall portion in downwardly divergent relation to said pole engaging bearing surfaces and of substantial length to constitute a downwardly and forwardly ranging cross arm engaging surface, the lower end of said inclined wall portion being the forward terminal of the body member, and a bottom wall portion extending inwardly from the lower end of said inclined wall portion and having a rearward end surface constituting a pole-engaging heel.

2. The invention as defined in claim 1, further characterized in that said upper vertical wall surface is provided with a through bolt receiving vertical slot.

3. The invention as defined in claim 1, further characterized in that said pole-engaging heel has projecting pole-engaging spur teeth.

4. A gain, for use between the upright face of a vertical pole and the inner and lower sides of a horizontal cross arm of substantially circular cross-section to oppose the downward and inward force imposed by the cross arm, comprising a body member having a pole engaging rearward side having generally vertical pole engaging bearing surfaces, and a forward side including an upper generally vertical wall portion substantially parallel to said pole engaging bearing surfaces and of substantial length to constitute a vertically ranging cross arm engaging member, a generally inclined wall portion extending downwardly and forwardly from said upper wall portion in downwardly divergent relation to said pole engaging bearing surfaces and of substantial length to constitute a downwardly and forwardly ranging cross arm engaging surface, the lower end of said inclined wall portion being the forward terminal of the body member, and a bottom wall portion extending downwardly and inwardly from the lower end of said inclined wall portion and having a rearward end surface constituting a pole-engaging heel.

KENNETH C. JENNE.

References Cited in the file of this patent

UNITED STATES PATENTS

| Number | Name | Date |
| --- | --- | --- |
| 840,009 | Peirce | Jan. 1, 1907 |
| 882,835 | McGillivray | Mar. 24, 1908 |
| 900,545 | Humiston | Oct. 6, 1908 |
| 900,663 | Callane | Oct. 6, 1908 |
| 1,260,951 | Baker | Mar. 26, 1918 |
| 1,583,409 | Marquart | May 4, 1926 |
| 1,740,769 | Faber | Dec. 24, 1929 |
| 2,201,138 | Hyde | May 21, 1940 |
| 2,606,952 | Cofer et al. | Aug. 12, 1952 |

FOREIGN PATENTS

| Number | Country | Date |
| --- | --- | --- |
| 425,376 | Germany | Feb. 18, 1926 |